Feb. 3, 1953     C. J. FRANKLIN     2,627,135
ARTIFICIAL BAIT
Filed Oct. 23, 1946
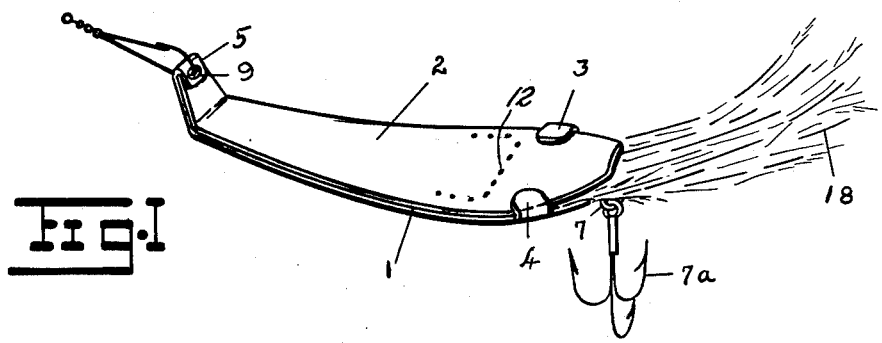
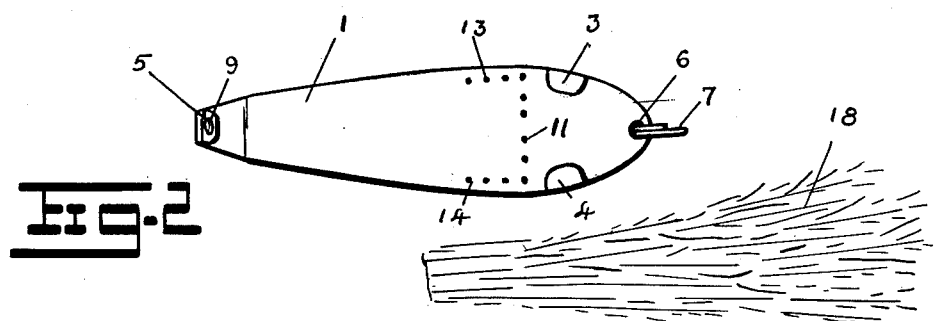
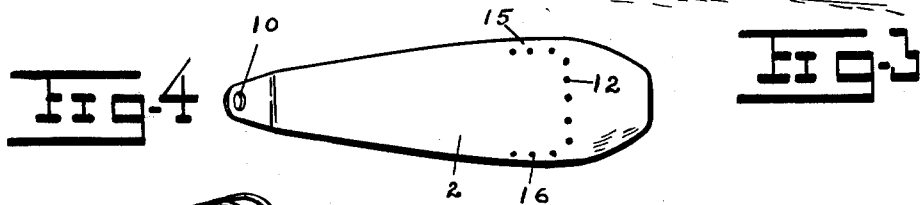
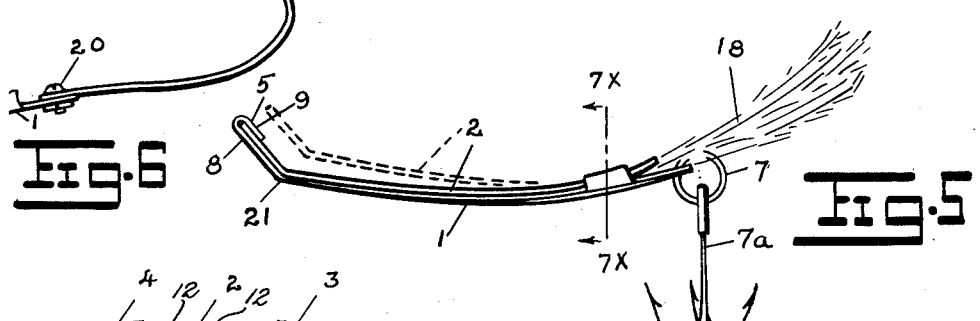
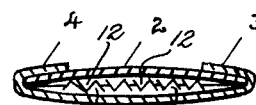
INVENTOR.
Charles J. Franklin

UNITED STATES PATENT OFFICE 2,627,135

ARTIFICIAL BAIT

Charles J. Franklin, Rochester, N. Y.

Application October 23, 1946, Serial No. 705,191

10 Claims. (Cl. 43—42.28)

Fishermen frequently use so-called spoon bait in fishing.

The object of this invention is to provide a new and improved form of spoon bait.

Another object of the invention is to provide a spoon bait composed of two plates held in close contact with each other between which plates at one end a cluster of feathers or a cluster of any flexible equivalent material or fibers is provided, which will give to the bait the appearance of a stream lined tail when drawn into the water.

Another object of the invention is to provide an attachment to the spoon bait that will more or less conceal the hook that forms a part of the spoon bait.

Another object of the invention is to provide the combination of the spoon bait and feathers in such manner as will simulate the form and progress of a small fish going through the water.

These and other objects of the invention will be illustrated in the drawings, described in the specification and pointed out in the claims at the end thereof.

In the drawings:

Figure 1 is a perspective view of the spoon bait with the feathers and hook attached thereto.

Figure 2 is a top plan view of the lower plate of the spoon bait with a ring attached thereto to which the hook can be attached.

Figure 3 is a detail view of a cluster of feathers or other fibrous material that can be used in connection with the spoon, as shown in Figure 1.

Figure 4 is a top plan view of the top plate of the assembly shown in Figure 1.

Figure 5 is a side elevation of the assembly shown in Figure 1.

Figure 6 shows the tail end of the plate shown in Figure 2 to which the hook is attached by a small bolt and nut.

Figure 7 is an enlarged vertical section through the spoon, the section being taken on the line 7x, 7x of Figure 5, the tail end of the plates being shown sprung apart so that the feathers can be inserted and clamped between them.

It will also be understood that this artificial bait will be made of metal that is thin and springy, although it is shown extra thick in the drawing for the purpose of showing it clearly.

In the drawings like reference numerals indicate like parts.

In Figure 2 of the drawings reference numeral 1 indicates the lower plate of the assembly shown in Figure 1 and in Figure 4 reference numeral 2 indicates the upper plate of the assembly shown in Figure 1. On the lower plate shown in Figure 2 three lugs are provided indicated by the reference numerals 3, 4 and 5. These lugs are integral with the lower plate and the upright portion of the two lugs 3 and 4 are formed so that they converge toward each other from front to back for a purpose that will appear presently.

The lower plate is preferably widest on a line forward of these two lugs and the sides of the lower plate in the rear of this line converge to each other with an oval shape as shown at the right hand end of Figure 2.

The upper plate 2 is shown in Figure 4 and conforms substantially in outline to the lower plate 1 except that it does not have lugs thereon and it is cut short at the rear end and is therefore more blunt than is the lower plate. This leaves the lower plate exposed back of the upper plate where the lower plate has a hole 6 therein in which is engaged a ring 7 to which the hook 7a may be conveniently attached.

At the left hand end of the lower plate as shown in Figure 2, the plate is bent up at an acute angle and doubled over on itself so as to form a lug 5 the top and bottom of which is perforated at 8 and 9 so that the two holes come in line with each other, one above the other.

The left hand end of the upper plate is also bent up at an acute angle and perforated as indicated at 10 in Figure 4.

Each of the plates is roughened with indentations. In the plate 1 these indentations 11 are struck up from below and in the upper plate these indentations 12 are struck down from above. In the lower plate these indentations 11 are preferably of an even number, six for example and in the upper plate they are preferably of an odd number as five for example so that the indentations of the one plate can engage in the spaces between the indentations of the other plate. These indentations are in lines extending across the plates.

As shown in Figure 2 six indentations are indicated in the lower plate and as shown in Figure 4 five indentations are shown in the upper plate, but it is obvious that the larger number of indentations can be shown in the upper plate and the smaller number of indentations can be shown in the lower plate.

It is also clear that any convenient number of indentations can be used in either plate.

It will also appear that a row of indentations can be placed along each side of each plate and as above explained the indentations on the sides of plate are staggered with reference to the indentations on the other plate. The indentations on the sides of the lower plate 1 are indicated by the reference numerals 13 and 14 and the indentations on the sides of the upper plate are indicated by the reference numerals 15 and 16.

These indentations are provided so that the plates will more firmly grip the feathers, etc. between them.

As shown in Figure 7, the plates 1 and 2 are preferably sprung apart at the rear end. The plates may or may not be parallel to each other on the lines 11 and 12 of the indentations so as to more firmly clamp the feathers 18 in place, but are preferably sprung apart at the rear end to permit the feathers to spread out and have a free action as the spoon is drawn through the water.

It will be understood that the feathers 18 are first placed on the lower plate and the upper plate is then inserted endwise from left to right as shown in Figure 1 so as to engage under the lugs 3 and 4 on the lower plate and above the feathers. The left hand end of the upper plate, in making the assembly, is placed to the left or right of the lug 5 on the lower plate and is sprung down and swung sideways so as to engage under the lug 5 so that the hole 10 registers with the holes 8 and 9 of the lower plate.

A ring or hook or any other suitable device can then be inserted through the three holes locking the forward end of the upper plate firmly in place on the forward end of the lower plate.

By removing the ring or hook, the two plates can be disengaged from each other and the feathers can be removed and be replaced with a new cluster, after which the two plates can be brought together again, clamping the new set of feathers in place.

The feathers may be of any size, length or breadth or color that suits the fancy or luck of the fisherman and can be changed at will in rather short order.

As shown in Figure 5, the upper plate 2 normally takes the position shown by dotted lines therein and should be sprung down before being swung into engagement with the lug 5. This will increase clamping effect of the two plates on the cluster of feathers.

As shown in Figure 5, the hook 7a is swung from a ring 7 that engages with the lower plate in the hole 6. In this case, the hook will swing backward when drawn through the water and will be more or less concealed by the feathers. As shown in Figure 6, the ring may be omitted and the hook may be clamped to the lower plate by a bolt and nut 20. In this case, too, a single hook may be used in place of a three-pronged hook.

It will also be understood that the two plates are bent up rather sharply at the forward end as indicated at 21 in Fig. 5 and that the two plates are also bent on their long axis into a curve having a long radius, which curve is shown in full lines in Fig. 5. The shape thus given to the plates will cause the spoon, when drawn through the water, to somewhat simulate the motion of a small fish.

I claim:

1. An artificial bait comprising an upper and a lower plate, each of said plates having the shape of an elongated oval that is narrow at the front end and wide at the rear end, each of said plates having their front ends bent obliquely, with respect to the remainder thereof, a lug on each side edge of the lower plate near the rear end thereof, said lugs being bent up and over the lower plate, and forming grooves that are furthest apart at the forward end of the lugs and nearest together at the rear end of the lugs, the rear end of the upper plate being adapted to engage under said lugs, the forward end of said upper plate being capable of being swung sideways into contact with the forward end of the lower plate, while in engagement with said lugs at the rear end of the lower plate, and a lug on the lower plate at the forward end thereof forming an extension, said lug being bent up and over the forward end of the lower plate and forming a groove in which the forward end of the upper plate is adapted to engage.

2. An artificial bait comprising an upper and a lower plate, each of said plates having the shape of an elongated oval that is narrow at the front end and wide at the rear end, each of said plates having their front ends bent obliquely, with respect to the remainder thereof, a lug on each side edge of the lower plate near the rear end thereof, said lugs being bent up and over the lower plate, and forming grooves that are furthest apart at the forward end of the lugs and nearest together at the rear end of the lugs, the rear end of the upper plate being adapted to engage under said lugs, the forward end of said upper plate being capable of being swung sideways into contact with the forward end of the lower plate while in engagement with said lugs at the rear end of the lower plate, a lug on the lower plate at the forward end thereof forming an extension, said lug being bent up and over the forward end of the lower plate and forming a groove in which the forward end of the upper plate is adapted to engage, said plates at their forward end and said lug each having a hole therethrough, said holes being in line with each other when the plates are placed in line with each other, and a hook engaging through said holes for holding the two plates together at the forward end.

3. An artificial bait comprising an upper and lower plate, lugs on the lower plate near the rear end thereof extending up and over the upper plate, and a lug on the lower plate at the forward end thereof extending rearwardly over the forward end of the upper plate, the forward end of both of said plates being bent obliquely with respect to the remainder thereof, the lugs at the rear end of the lower plate permitting the forward end of the upper plate to be moved sideways, and permitting the upper plate then to be moved forward and endwise out of engagement with the lugs at the rear end of the lower plate.

4. An artificial bait comprising an upper and lower plate, lugs on the side edges of the lower plate near the rear end thereof extending up and over the upper plate, a lug on the lower plate at the forward end thereof, extending rearwardly over the forward end of the upper plate, the forward ends of both of said plates being bent obliquely with respect to the remainder thereof, and feathers clamped between the two plates at the rear end thereof and forward of the rear lugs and extending rearwardly from the plate, the lugs at the rear end of the lower plate permitting the forward end of the upper plate to be moved sideways and permitting the upper plate then to be moved forward and endwise out of engagement with the lugs at the rear end of the lower plate, one of said plates being sprung in relation to the other, said plates being adapted to resiliently bear against one another forward of the rear lugs.

5. An artificial bait comprising an upper and a lower plate, each of said plates having the shape of an elongated oval that is narrow at the front end and wide at the rear end, a lug on each side edge of the lower plate near the rear end thereof, said lugs being bent up and over the lower plate, and forming grooves that are furthest apart at the forward end of the lugs and nearest together at the rear end of the lugs, the rear end of the upper plate being adapted to engage under said lugs, the forward end of said upper plate being capable of being swung sideways into contact with the forward end of the lower plate while in engagement with said lugs at the rear end of the lower plate, the front end of both plates being bent up sharply at an oblique angle to the rest of the plates, one of said plates being sprung in relation to the other whereby to produce a clamping force between said plates forward of the rear lugs.

6. An artificial bait comprising an upper and lower plate, lugs on the lower plate near the rear end thereof extending up and over the upper plate, a lug on the lower plate at the forward end thereof extending rearwardly over the forward end of the upper plate, the lugs at the rear end of the lower plate permitting the forward end of the upper plate to be moved sideways, and permitting the upper plate then to be moved forward and endwise out of engagement with the lugs at the rear end of the lower plate, and a row of teeth on each plate near the rear end thereof but forward of said rear end lugs, the teeth on each plate being pointed toward the other plate, said upper plate being resilient and being sprung with the teeth of both plates bearing against one another when secured in position by said lugs.

7. An artificial bait comprising an upper and lower plate, lugs on the lower plate near the rear end thereof extending up and over the upper plate, a lug on the lower plate at the forward end thereof extending rearwardly over the forward end of the upper plate, the lugs at the rear end of the lower plate permitting the forward end of the upper plate to be moved sideways, and permitting the upper plate then to be moved forward and endwise out of engagement with the lugs at the rear end of the lower plate, a row of teeth on each plate near the rear end thereof but forward of said rear end lugs, the teeth on each plate being pointed toward the other plate, said upper plate being resilient and being sprung with the teeth of both plates bearing against one another when secured in position by said lugs, and feathers having stems clamped between the two plates and extending rearwardly from the two plates, the stems of the feathers engaged between the rows of teeth.

8. An artificial bait comprising an upper and lower plate, lugs on the lower plate near the rear end thereof extending up and over the upper plate, a lug on the lower plate at the forward end thereof extending rearwardly over the forward end of the upper plate, the lugs at the rear end of the lower plate permitting the forward end of the upper plate to be moved sideways, and permitting the upper plate then to be moved forward end endwise out of engagement with the lugs at the rear end of the lower plate, the forward end of both plates being bent obliquely and having means therein for attaching a line, a row of teeth on each plate near the rear end thereof but forward of said rear end lugs, the teeth on each plate being pointed toward the other plate, said upper plate being resilient and being sprung with the teeth of both plates bearing against one another when secured in position by said lugs, and feathers having stems clamped between the two plates and extending rearwardly from the two plates, the stems of the feathers being engaged between the rows of teeth.

9. An artificial bait comprising a resilient plate having a generally elongated oval shape, said plate being slightly concave lengthwise thereof, and having a short end portion at the leading end bent upwardly at an angle of approximately 45°, said end portion having means for attaching a line adjacent the tip end thereof, means for securing a hook in the trailing end, a series of upwardly projecting indentations arranged on a line extending transversely across the plate adjacent its widest portion, a second resilient plate having a generally elongated oval shape and adapted to lie on the first plate, the contour of the second plate lying along and within the contour of the first-named plate, said last-named plate having a series of downwardly projecting indentations arranged on a line extending transversely across the plate adjacent its widest portion, and means for securing said plates together with the indentations of one plate parallel to, facing, and immediately adjacent the indentations of the other plate, said last-named means being spaced from said indentations, and being adapted to resiliently urge the widest portions of both plates toward one another whereby to provide by said indentations a resilient grip between said plates for holding a cluster of feathers or the like.

10. An artificial bait comprising two plates suitably held together and having feathers clamped between the plates at the rear end thereof and extending rearwardly from the plate, each of said plates having the shape of an elongated oval and each of the plates being bent up at an oblique angle at its forward end, the end of one of said plates having a reverse bend embracing the end of the other plate, and means for attaching a line to said bent up forward ends and through the reverse bend, the balance of the plates being bent with a radius on a concave curve on its longitudinal axis, said radius being several times the length of the plates, the plates being in nested relation to one another in a bait that will wiggle on its long axis when drawn through the water, said line attaching means being located adjacent the tip of the oblique bent up forward ends.

CHARLES J. FRANKLIN.

REFERENCES CITED

The following references are of record in the file of this patent:

UNITED STATES PATENTS

| Number | Name | Date |
| --- | --- | --- |
| 233,964 | Bear | Nov. 2, 1880 |
| 341,261 | McHarg | May 4, 1886 |
| 717,722 | Strickland | Jan. 6, 1903 |
| 1,568,325 | Dewey | Jan. 5, 1926 |
| 1,986,282 | Parker | Jan. 1, 1935 |
| 2,003,976 | Raymond | June 4, 1935 |
| 2,039,039 | Steen | Apr. 28, 1936 |
| 2,213,701 | Haselwood | Sept. 3, 1940 |
| 2,313,572 | Nungesser | Mar. 9, 1943 |
| 2,463,889 | Lundemo | Mar. 8, 1949 |

FOREIGN PATENTS

| Number | Country | Date |
| --- | --- | --- |
| 53,179 | Denmark | June 7, 1937 |
| 103,008 | Sweden | Nov. 11, 1941 |